May 23, 1933.   D. CLUTE ET AL   1,911,138
DRILLING MACHINE
Filed June 4, 1930   2 Sheets-Sheet 1

Inventors
DONALD CLUTE.
LESTER STERLING.
By Wesley P. Muriel
Attorney

Inventors
DONALD CLUTE.
LESTER STERLING.

Patented May 23, 1933

1,911,138

UNITED STATES PATENT OFFICE

DONALD CLUTE AND LESTER STERLING, OF DETROIT, MICHIGAN, ASSIGNORS TO THE OILGEAR COMPANY, OF MILWAUKEE, WISCONSIN, A CORPORATION OF WISCONSIN

DRILLING MACHINE

Application filed June 4, 1930. Serial No. 459,154.

This invention relates to drilling machines.

The machine to which the invention applies in particular is ordinarily employed for drilling deep holes and has a rotary spindle to which a drill or boring tool may be attached, a drive for rotating the spindle, and a feed for advancing the drill into the work.

A deep hole cannot be formed by a continuous operation as the chips removed from the work accumulate in the flutes or grooves of the drill and bind against the sides of the hole so that the spindle must be retracted at intervals to free the drill from the accumulation of chips.

Heretofore, a hand-operated feed was employed in order that the spindle might be retracted whenever the chips caused the drill to bind, and the operator depended solely upon his experience to know when to retract the drill.

An object of the invention is to provide a machine which will automatically retract the drill to free the same from chips which are causing it to bind.

Another object is to automatically retract the drill a short distance each time that the same binds and to fully retract the drill after its operation is completed.

Another object is to automatically retract the drill whenever the resistance to its forward movement reaches a predetermined maximum.

Another object is to provide a machine which is positive and precise in operation.

According to the invention in its general aspect and as ordinarily embodied in practice, the spindle is retracted to a point short of its fully retracted position in response to a predetermined maximum tool resistance and is then automatically readvanced to the point from which it was retracted.

According to the invention in another aspect, the machine is provided with a tool carrying head and a work carrying head having relative rotary and axial movements, a tool carried by the tool head, a hydraulic motor for reciprocating the axially movable head, and fluid actuated means for reversing the motor substantially instantly upon the resistance to tool movement reaching a predetermined maximum.

Figure 1:
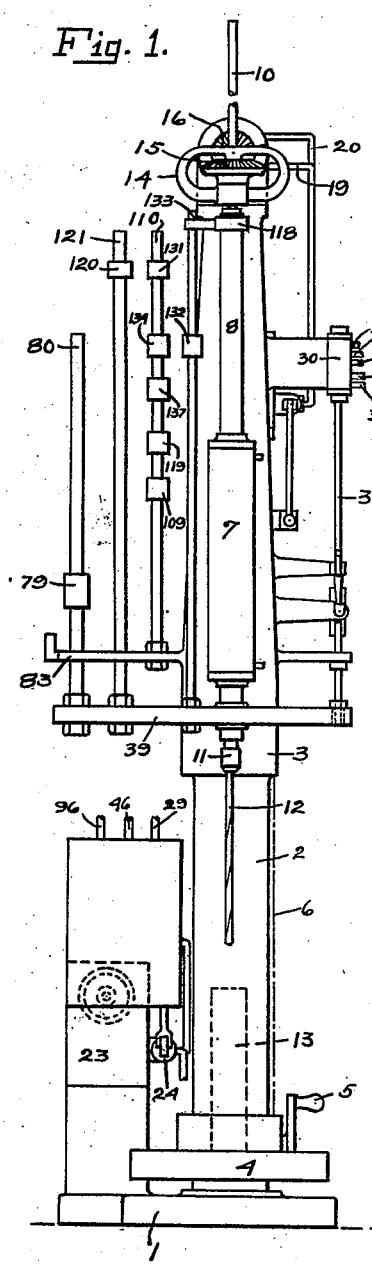
Figure 2:
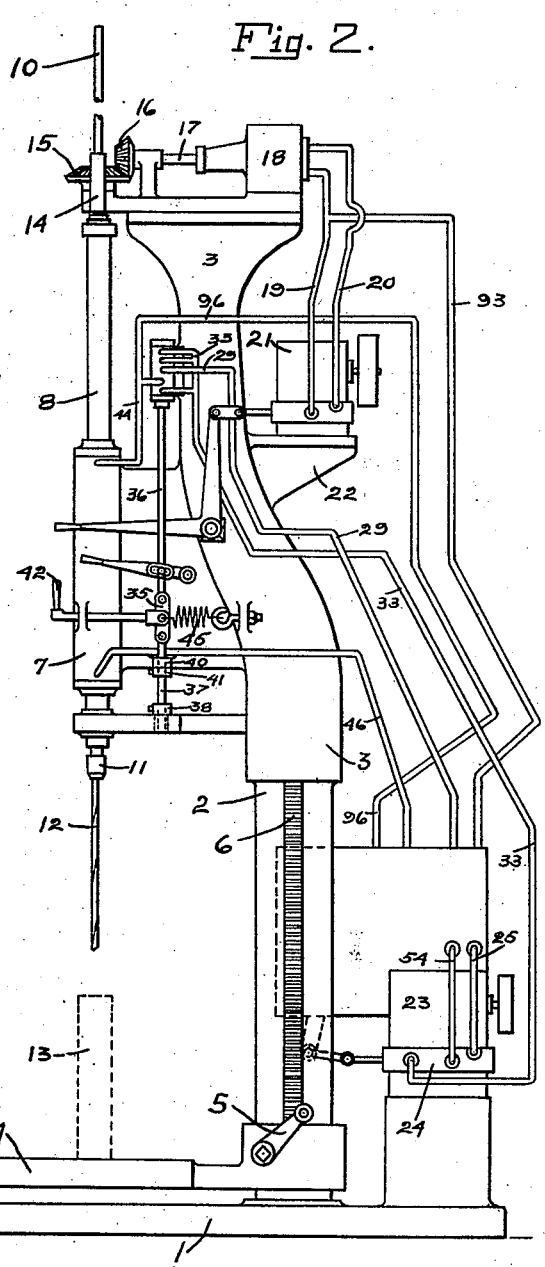
Figure 3:
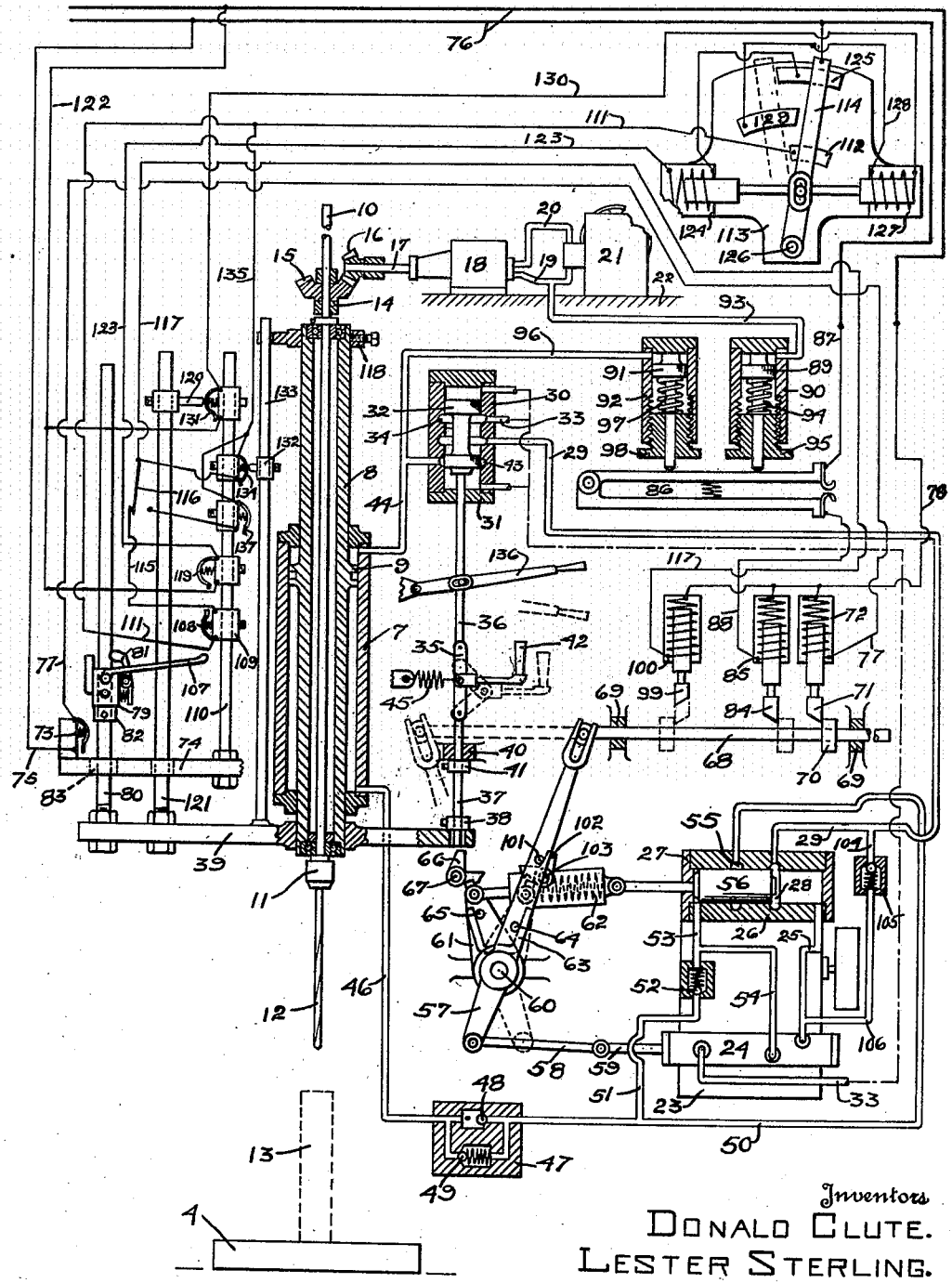

A hydraulically operated drill press embodying the invention is illustrated in the accompanying drawings in which the views are as follows:

Fig. 1 is a front view of the drill press.
Fig. 2 is a side view thereof.
Fig. 3 is a schematic view illustrating the hydraulic and electric circuits and showing certain motors and valves in central section.

The drill press is provided with a base 1 having a vertical column 2 arranged thereon and supporting a frame 3 which carries the mechanism of the drill press. The column 2 has a work table 4 arranged thereon and adapted to be raised or lowered by rotating a handle 5 to operate gearing (not shown) which engages a rack 6 carried by the column 2.

The frame 3 carries a feed cylinder 7 in which a tubular ram 8 is arranged and provided intermediate its ends with an annular piston 9 against which hydraulic pressure is exerted to raise and lower the ram.

A spindle 10 is journaled in the ram 8, fixed for axial movement therewith and provided at its lower end with a chuck 11 to receive a drill 12 for operating upon a piece of work 13 carried by the table 4.

The spindle 10 is also journaled in a double bearing 14 carried by the top of the frame 3, and is rotated by a bevel gear 15 which is splined thereon and held against axial movement by the bearing 14.

The gear 15 meshes with a bevel gear 16 fixed upon the shaft 17 of a hydraulic motor 18 which is carried upon the top of the frame 3 and driven by liquid supplied through pipes 19 and 20 from a pump 21 arranged upon a bracket 22 carried by the frame 3.

The motor 18 is a conventional type constant displacement motor and the pump 21 is a conventional constant speed variable delivery pump which may be adjusted to vary the delivery of liquid to the motor 18 and thereby vary the rotary speed of the spindle 10.

The ram 8 and the spindle 10 are advanced and retracted by liquid supplied to the cylinder 7 from a variable delivery pump 23 which is adjustable to vary its delivery from the full capacity of the pump to substantially zero and thus vary the axial velocity of the ram 8.

Liquid is delivered to the cylinder 7 at the full capacity of the pump 23 to provide a rapid traverse for the ram 8 and at a lower rate to feed the drill 12 into the work.

The pump 23 has a control (not shown), which may be adjusted to vary the feeding rate of delivery and thus vary the rate at which the drill 12 is fed into the work, and a valve 24 which is operated automatically to change the direction of flow of liquid between the pump 23 and the cylinder 7 and to cause the pump to deliver liquid at either its full capacity or at the feeding rate.

The pump 23 and its valve 24 form no part of the present invention and have not been described herein as a pump and its valve which may be employed are fully illustrated and described in Patent No. 1,753,562 issued April 8, 1930 to John P. Ferris.

Liquid discharged from the pump 23 normally passes through the valve 24 and a pipe 25 into the cylinder 26 of an automatically operated valve 27 and then through a port 28 and a pipe 29 into the cylinder 30 of a feed control valve 31 which contains a valve plunger 32 to control the flow of liquid to and from the cylinder 7.

When the valve plunger 32 is in the position shown in Fig. 3, the liquid is returned to the pump 23 through a return pipe 33, which has its lower end connected to the valve 24 and its upper end in communication with an annular port 34 formed in the inner wall of the cylinder 30.

The valve plunger 32 is initially held in the position shown by a toggle joint 35 which has its upper arm pivoted to the stem 36 of the valve plunger and its lower arm pivoted to a rod 37 which has a collar 38 secured upon its lower end and engaged by a support 39 carried by the ram 8.

The rod 37 passes through an arm 40 carried by the frame 3 and through the support 39 to be guided thereby, and is held against upward movement by a collar 41 which is fixed thereon and abuts the under side of the arm 40.

The toggle joint 35 has a handle 42 attached thereto which may be drawn outward, as shown in dotted lines in Fig. 3, to break the joint 35 and draw the valve stem 36 and the rod 37 towards each other. As the collar 41 prevents upward movement of the rod 37, the valve stem 36 and the valve plunger 32 are drawn downward, the upper part of the valve plunger 32 covers the return port 34 and the lower part of the plunger 32 uncovers an annular port 43 which is connected to the upper end of the feed cylinder 7 by a pipe 44.

The liquid delivered to the valve cylinder 30 by the pipe 29 then passes through the pipe 44 to the upper end of the cylinder 7 and exerts pressure upon the piston 9 to force the ram 8 and the spindle 10 downward.

At this time, the pump 23 is delivering liquid at its full capacity to the upper end of the cylinder 7 so that the ram 8 moves downward at a rapid rate and quickly moves the support 39 out of engagement with the collar 38. The handle 42 is then released and the arms of the joint 35 are drawn into alignment with the valve stem 36 and the rod 37 by a tension spring 45 which has one end connected to the inner end of the handle 42 and its other end connected to the frame 3. This moves the rod 37 downward and separates the collar 41 from the arm 40.

As the ram 8 moves downward, liquid is returned to the pump 23 through a pipe 46 and a free return resistance valve 47 which comprises a check valve 48 and a resistance valve 49 connected in parallel. The check valve 48 permits liquid to pass freely from the pump to the cylinder 7 but prevents it from passing in the opposite direction except through the resistance valve 49 which offers sufficient resistance to the passage thereof to prevent the ram 8 from moving downward when the machine is idle.

The liquid flows from the valve 47 through a pipe 50, a pipe 51 which is connected to the pipe 50 intermediate the ends thereof, a check valve 52, a pipe 53, a pipe 54 which is connected to the pipe 53 intermediate the ends thereof, and through the valve 24 into the pump 23.

The other end of the pipe 50 is connected to the valve cylinder 26 and communicates with an annular port 55 which is formed in the inner wall thereof and closed at this time by the plunger 56 of the valve 27. The other end of the pipe 53 is connected into the front end of the valve cylinder 26 so that liquid expelled from the lower part of the cylinder 7 acts against the forward end of the valve plunger 56 and tends to move the same rearward, but this tendency is overcome by the pressure of the liquid delivered to the rear end of the valve cylinder 26 by the pipe 25.

The ram 8 continues to move downward at the rapid rate until the valve 24 is operated to change the delivery of the pump 23 from its full capacity to the feeding rate. The valve 24 is operated by an operating lever 57 which is connected at its lower end to the valve stem 59 of the valve 24 by a link 58, and pivoted intermediate its ends upon a stationary shaft 60.

The shaft 60 also has a lever 61 journaled thereon and connected at its upper end to the plunger 56 of the valve 27 through an equalizing spring 62. The levers 57 and 61 are urged toward each other by a torsion spring 63 which is coaxial with the shaft 60 and has its ends in engagement with pins 64 and 65 carried, respectively, by the levers 57 and 61 and arranged at different distances from the shaft 60 so as to pass each other when the levers are actuated.

The upper end of the lever 61 is initially held against movement toward the lever 57 by a latch 66 which engages the same and is pivoted upon a stationary pin 67. The lever 57 is held against movement toward the lever 61 by a slidable bar 68 which is connected to the upper end thereof and arranged in guides 69 to slide therein. The bar 68 has a stop 70 fixed thereon and initially in engagement with a latch 71 carried by the core of a solenoid 72 which is controlled by a self-opening switch 73 arranged upon a bracket 74 carried by the frame 3.

The switch 73 has one of its terminals connected by a conductor 75 to one side of a power line 76 and its other terminal connected by a conductor 77 to one end of the winding of the solenoid 72, the other end of which is connected by a conductor 78 to the other side of the power line 76.

After the ram 8 has moved downward a predetermined distance, the switch 73 is closed by an actuator 79 which is arranged in an adjusted position upon a post 80 carried by the support 39 and moved downward with the ram 8. The actuator 79 is slidable upon the post 80 and frictionally held against longitudinal movement thereon by a spring pressed friction arm 81 which is pivoted upon the actuator and engages the side of the post.

The bottom of the actuator 79 is initially brought into engagement with a collar 82 which is clamped to the post 80 in such a position that the actuator 79 closes the switch 73 just before the drill 12 engages the work 13. The collar 82 passes through an opening 83 in the bracket 74 as the post 80 moves downward and the actuator 79 abuts the bracket 74 just after it closes the switch 73 and is thus held against further downward movement.

When the switch 73 is closed by the actuator 79, the solenoid 72 is energized and retracts the latch 71 which releases the stop 70 and allows the spring 63 to swing the operating lever 57 toward the lever 61 until the stop 70 engages a latch 84 which is carried by the core of a solenoid 85. The movement of the operating lever 57 operates the valve 24 to reduce the output of the pump 23 from its full capacity to the predetermined feeding rate.

The liquid delivered by the pump 23 to the cylinder 7 then moves the ram 8 downward at a relatively slow speed to feed the drill 12 into the work 13, and the post 80 moves through the actuator 79 which is held in position by the bracket 74 and keeps the switch 73 closed.

The ram 8 continues to move downward until the resistance to the rotary movement of the spindle 10 increases above a certain predetermined maximum, as by the drill 12 binding in the work 13, or until the resistance to the downward movement of the spindle 10 increases above a predetermined maximum, as by meeting an obstruction or the drill 12 becoming dull, or until the drill 12 has penetrated the work 13 to the desired depth.

The ram 8 is then retracted by energizing the solenoid 85 to move the latch 84 out of engagement with the stop 70 which allows the spring 63 to swing the operating lever 57 into alignment with the lever 61, as shown in dotted lines in Fig. 3, and operate the valve 24 to direct the output of the pump 23 into the bottom of the cylinder 7.

The solenoid 85 is controlled by a self-opening switch 86 which has one of its terminals connected to one side of the power line 76 by a conductor 87 and its other terminal connected by a conductor 88 to one end of the winding of the solenoid 85, the other end of which is connected to the other side of the power line 76 by the conductor 78.

The switch 86 may be closed by a piston 89, which is arranged in a cylinder 90 and is responsive to an increase in the driving torque of the spindle 10, or by a piston 91 which is arranged in a cylinder 92 and is responsive to an increase in the resistance of the forward movement of the drill 12.

The cylinder 90 is connected to the pipe 19 by a pipe 93 so that the piston 89 is subjected to the hydraulic pressure which prevails in the motor 18. The hydraulic pressure upon the piston 89 is opposed by a helical compression spring 94 arranged between the piston 89 and an adjusting head 95 which closes the outer end of the cylinder 90 and may be advanced or retracted to vary the tension of the spring 94 and consequently vary the hydraulic pressure required to advance the piston 89 and close the switch 86.

The cylinder 92 is connected to the pipe 44 by a pipe 96 so that the piston 91 is subjected to the hydraulic pressure which prevails in the top of the cylinder 7. The hydraulic pressure upon the piston 91 is opposed by a helical compression spring 97 arranged between the piston 91 and an adjusting head 98 which closes the outer end of the cylinder 92 and may be advanced or retracted to vary the tension of the spring 97 and consequently vary the hydraulic pressure required to advance the piston 91 and close the switch 86.

An increase in the resistance to the rotary movement of the spindle 10 increases the torque of the motor 18 and, as the pump 21 is driving the motor 18 through a solid column of liquid in pipe 19, the hydraulic pressure in the pipes 19 and 93 and in the rear end of the cylinder 90 increases in proportion to the increase in resistance. When the pressure in the cylinder 90 becomes sufficient to overcome the spring 94, the piston 89 advances and closes the switch 86.

Similarly, an increase in the resistance to the downward movement of the spindle 10 causes a corresponding increase in hydraulic pressure in the upper end of the cylinder 7, the pipes 44 and 96, and in the rear end of the cylinder 92, and, when the pressure in the cylinder 92 becomes sufficient to overcome the resistance of the spring 97, the piston 91 advances and closes the switch 86.

When the switch 86 is closed to energize the solenoid 85, the operating lever 57 is swung into alignment with the lever 61 as previously described, the stop 70 moves behind a latch 99 which is carried by the core of a solenoid 100 and holds the lever 57 against return movement, and a pin 101 on the lever 57 abuts the latch 66 and disengages it from the lever 61.

The movement of the lever 57 operates the valve 24 which causes the pump 23 to deliver liquid at its full capacity through the valve 24 and the pipe 54 into the pipe 53. As the check valve 52 prevents the liquid from passing into the pipe 51, the same is directed into the front end of the cylinder 26 and moves the valve plunger 56 rearward to close the port 28, open the port 55 and swing the lever 61 against the action of the spring 63 into the position initially occupied by the lever 57, as shown in dotted line in Fig. 3. The lever 61 is then held in that position by a latch 102 which is pivoted upon a stationary pin 103 and engages the upper end of the lever 61 as the same arrives in that position.

From the valve cylinder 26, the liquid passes through the port 55, the pipe 50, the check valve 48, and the pipe 46 into the bottom of the cylinder 7 and moves the ram 8 upward at a rapid rate. The liquid in the top of the cylinder 7 is returned to the pump 23 through the pipe 44, the valve cylinder 30, the pipe 29, a pipe 104 which is connected to the pipe 29 intermediate its ends, a check valve 105, a pipe 106 which is connected to the pipe 25 intermediate its ends, and then through the pipe 25 and the valve 24 into pump 23.

Each time that the drill binds, it is either retracted a predetermined distance or retracted to a predetermined point, then fed downward at high speed until just before the drill again engages the work, and then fed into the work at the predetermined feeding rate.

When the ram 8 moves upward, the friction arm 81 causes the actuator 79 to move upward with the post 80 and disengage the switch 73 which opens automatically and de-energizes the solenoid 72, allowing its core to drop and place the latch 71 in the path of the stop 70.

If the drill is to be retracted a predetermined distance, an arm 107 on the actuator 79 engages and closes a self-opening switch 108 which is arranged at the same distance above the switch 73 and carried by a collar 109 which is secured in an adjusted position upon a post 110 carried by the bracket 74.

One terminal of the switch 108 is connected by a conductor 111 to a contact 112 of a circuit-changing switch 113 which has a contact lever 114 connected to one side of the power line 76 and, at this time, in engagement with the contact 112. The other terminal of the switch 108 is connected by a conductor 115, a hand-operated switch 116, and a conductor 117 to one end of the winding of the solenoid 100, the other end of which is connected to the other side of the power line 76 by the conductor 78.

When the arm 107 closes the switch 108, the solenoid 100 is energized and retracts the latch 99 to release the stop 70, the spring 63 swings the lever 57 to its initial position as shown in Fig. 3, the pin 101 trips the latch 102, the lever 57 operates the valve 24 which causes the pump 23 to deliver liquid at its full capacity through the pipe 25, the valve 27, the pipe 29, the valve 31 and the pipe 44 to the upper end of the cylinder 7, and the ram 8 is advanced at high speed until the drill 12 very nearly reaches the position from which it was retracted, at which time, the actuator 79 closes the switch 73 and causes the drill to be advanced at the predetermined feeding rate. In passing through the valve 27, the liquid forces the piston 56 and the lever 61 to their initial positions in which they are held by the latch 66 engaging the upper end of the lever 61.

The ram 8 continues to move downward at the feeding rate until the resistance to the rotary or axial movement of the drill 12 causes a pressure to be created either in the cylinder 90 or in the cylinder 92 which is sufficient to overcome the resistance of the spring 94 or the spring 97 and close the switch 86 to cause the ram 8 to be retracted again.

The drill is thus retracted only when it meets a predetermined resistance and is alternately retracted and advanced as often as it meets that resistance until it completes its operation, at which time, the ram 8 is retracted to its uppermost or starting position.

When the drill 12 completes its operation, further downward movement thereof is prevented by collar 118 which is secured in an adjusted position upon the ram 8 and abuts the top of the cylinder 7, thus stopping the drill exactly at a predetermined point and causing an increase in the hydraulic pressure in the upper ends of the cylinders 7 and 92. This increase in hydraulic pressure causes the ram to be retracted at high speed as previously described.

Just as or before the collar 118 abuts the top of the cylinder 7, a self-opening switch 119 is closed by an actuator 120 which is secured in an adjusted position upon a post 121 carried by the support 39. The switch 119 is secured in an adjusted position upon the post 110 and has one of its terminals connected to one side of the power line 76 by a conductor 122 and its other terminal connected by a conductor 123 to one end of the winding of a solenoid 124 which forms a part of the switch 113. The other end of the winding of the solenoid 124 is connected to a contact 125 which forms a part of the switch 113 and, at this time, is engaged by one end of the contact lever 114 and connected thereby to the other side of the power line 76.

The contact lever 114 is pivoted at its other end upon a stationary pin 126 and is connected intermediate its ends to the core of the solenoid 124 and also to the core of a solenoid 127. One end of the winding of the solenoid 127 is connected by a conductor 128 to a contact 129 of the switch 113 and the other end thereof is connected by a conductor 130 to one terminal of a self-opening switch 131 which is secured in an adjusted position upon the post 110 and closed by the actuator 120 when the ram 8 is in its starting position. The other terminal of the switch 131 is connected in circuit by a branch of the conductor 122.

When the switch 119 is closed by the actuator 120 the solenoid 124 is energized and its core swings the contact lever 114 out of engagement with the contacts 112 and 125, to remove the switch 108 from circuit and to deenergize the solenoid 124, and into engagement with the contact 129 to connect the winding of the solenoid 127 in circuit with the switch 131.

As the ram 8 moves upward, the arm 107 closes the switch 108 but the solenoid 100 is not deenergized as the switch 113 has broken the circuit between the switch 108 and the power line 76. Consequently, the ram 8 continues to move upward until the actuator 120 closes the switch 131 and an actuator 132, which is secured in an adjusted position upon a post 133 carried by the support 39, closes a self-opening switch 134 which is secured in an adjusted position upon the post 110. One terminal of the switch 134 is connected to the conductor 117 and the other terminal thereof is connected by a conductor 135 to the conductor 111.

When the switch 131 is closed, the solenoid 127 is energized and swings the contact lever 114 out of engagement with the contact 129 and into engagement with the contacts 112 and 125 to remove the solenoid 127 and the switch 131 from circuit and to connect the switches 108 and 134 in circuit with the solenoid 100.

When the switch 134 is closed, the solenoid 100 is energized and retracts the latch 99 to release the stop 70 and allow the spring 63 to move the lever 57 into its starting position in which it is held by the latch 71 engaging the stop 70.

As the ram approaches its initial or starting position, the support 39 engages the collar 38 on the rod 37 and moves the valve plunger 32 into its initial position to direct the output of the pump 23 into the return pipe 33. All parts of machine are then in starting position, as shown in Fig. 3.

If another hole is to be drilled through the same surface of the work 13 or through another surface in the same plane and, if the hole is to be drilled to the same depth as the first hole, the actuator 79 is moved into engagement with collar 82 and the handle 42 is pulled outward to start the machine which will drill the hole without further attention from the operator.

If the work to be drilled is located in a different plane, the table 4 may be adjusted as to height or the several switches and actuators may be readjusted. If the hole is to be drilled to a different depth, the collar 118 is adjusted to a new position upon the ram 8 and the switch 119 is relocated upon the post 110. Also the stroke of the ram 8 may be reduced by lowering the collar 118, the switches 131 and 134, and the actuators 120 and 132.

In order to facilitate the making of adjustments, a hand lever 136 is provided which is pivoted upon the frame 3 and connected to the stem 36 of the valve plunger 32. If the collar 38 is loosened, or if the collar 41 is loosened and the handle 42 drawn outward, the ram 8 may be manipulated into any desired position by operating the hand lever 136. The corresponding actuators or switches may then be readily adjusted while the ram is in that position.

If, instead of retracting the drill a predetermined distance each time that it binds, it is desired to retract it each time to the same point, the switch 116 is operated to disconnect the conductor 117 from the switch 108 and connect it to one terminal of a self-opening switch 137 which is secured in an adjusting position upon the post 110. The other terminal of the switch 137 is connected to the conductor 135 so that the switch 137 is in parallel with the switch 134 and performs exactly the same function but at a different elevation.

The switch 137 is adjusted upon the post 110 in a position corresponding to the point to which the drill 12 is to be retracted and the machine is started. The actuator 132 moves downward with the ram 8, passes the switch 137, and continues to move downward until the resistance to the movement of the drill 12 reaches the predetermined maximum and causes the ram to be retracted.

As the switch 108 has been removed from circuit by the switch 116, the solenoid 100 will not be energized when the arm 107 closes the switch 108 and the ram 8 will continue to rise until the actuator 132 closes the switch 137 which will energize the solenoid 100 and cause the ram to be moved downward as previously described. The ram will thus be retracted to the same point each time that the resistance to the movement of the drill 12 reaches a predetermined maximum.

After the drill completes its operation, the ram is retracted by the collar 118 engaging the top of the cylinder 7 and the actuator 120 closes the switch 119 to remove the switches 134 and 137 from circuit. When the ram reaches the limit of its upward movement, the actuator 120 closes the switch 131 to connect the switches 134 and 137 in circuit, the actuator 132 closes the switch 134 to energize the solenoid 100 and cause the lever 57 to be returned to its initial position, and the support 39 raises the valve plunger 32 to disconnect the cylinder 7 from the pump 23.

The invention herein set forth is susceptible of various modifications and adaptations without departing from the scope thereof as hereafter claimed.

The invention is hereby claimed as follows:

1. A machine for drilling or boring deep holes, comprising a tool carrying head and a work carrying head having relative rotary and axial movements, a tool carried by one of said heads, a hydraulic drive for producing said rotary movement, a hydraulic motor for producing said axial movement, and fluid actuated means responsive to the resistance to said rotary movement for automatically reversing said motor substantially instantly upon said resistance reaching a predetermined maximum.

2. A machine for drilling or boring deep holes, comprising a tool carrying head and a work carrying head having relative rotary and axial movements, a tool carried by one of said heads, a drive for rotating one of said heads, hydraulic means for moving one of said heads from a fully retracted position toward the other head, means responsive to the resistance to the forward movement of said movable head for operating said hydraulic means to cause the same to retract said movable head, and means for stopping said movable head a point short of said fully retracted position.

3. A machine for drilling or boring deep holes, comprising a stationary head, a second head movable axially toward and from said first mentioned head, a tool carried by one of said heads, a continuous drive for rotating one of said heads, power means for advancing said movable head from a fully retracted position toward the other head, means responsive to tool resistance for reversing said power means to retract said movable head to a point short of said fully retracted position, and means operable at said point for automatically reversing said power means again to readvance said movable head after the same has been retracted.

4. A machine for drilling or boring deep holes, comprising a frame, a spindle arranged in said frame, a hydraulic drive motor for rotating said spindle, a hydraulic feed motor for advancing said spindle, a tool carried by said spindle, means responsive to the clogging of said tool for reversing said feed motor to cause said spindle to be retracted, and means responsive to the fluid pressure in said feed motor for reversing said feed motor to retract said spindle.

5. A machine for drilling or boring deep holes, comprising a frame, a spindle arranged in said frame, a hydraulic motor for rotating said spindle, a pump connected to said motor for driving the same, a hydraulic feed for advancing said spindle, and means connected to said motor and responsive to a predetermined increase in hydraulic pressure therein for reversing said feed and thereby causing said spindle to be retracted.

6. A drilling machine, comprising a frame, a cylinder carried by said frame, a ram arranged in said cylinder and extending through the same, a spindle journaled in said ram and fixed for axial movement therewith, a hydraulic motor for rotating said spindle, a pump connected to said motor for driving the same, a pump connected to said cylinder for supplying liquid to one end thereof to advance said ram and said spindle, means connected to said cylinder and responsive to a predetermined increase in pressure therein to cause said pump to deliver liquid to the other end of said cylinder and retract said ram and said spindle, and means connected to said motor and responsive to a predetermined hydraulic pressure therein for causing said pump to deliver liquid to the reversing end of said cylinder and retract said ram and said spindle.

7. A drilling machine, comprising a frame, a spindle arranged in said frame, a drill carried by said spindle, a drive for rotating said spindle, a feed for advancing said spindle independently of said drive to pass said drill into the article to be drilled, means responsive to the torque of said spindle for reversing said feed to retract said spindle a short distance each time said torque reaches a predetermined maximum, means operable at the end of said distance to reverse said feed and readvance said spindle, and means responsive to said spindle reaching a predetermined point for automatically reversing said feed to fully retract said spindle after said drill has completed its operation.

8. A drilling machine, comprising a frame, a spindle arranged in said frame, a drill carried by said spindle, a drive for rotating said spindle, a feed for advancing said spindle independently of said drive to pass said drill into the article to be drilled, means responsive to the resistance to the forward movement of said drill for reversing said feed to retract said spindle a short distance each time said resistance reaches a predetermined maximum, means operable at the end of said distance to reverse said feed and readvance said spindle, and means responsive to said spindle reaching a predetermined point for automatically reversing said feed to fully retract said spindle after said drill has completed its operation.

9. A drilling machine, comprising a frame, a spindle arranged in said frame, a hydraulic drive for rotating said spindle, a hydraulic feed for advancing said spindle independently of said drive to pass said drill into the article to be drilled, means responsive to the torque of said spindle for reversing said feed to retract said spindle a short distance each time said torque reaches a predetermined maximum, means operable at the end of said distance to reverse said feed and readvance said spindle, and means responsive to said spindle reaching a predetermined point for automatically reversing said feed to fully retract said spindle after said drill has completed its operation.

10. A drilling machine, comprising a frame, a spindle arranged in said frame, a hydraulic drive for rotating said spindle, a hydraulic feed for advancing said spindle independently of said drive to pass said drill into the article to be drilled, means responsive to the resistance to the forward movement of said drill for reversing said feed to retract said spindle a short distance each time said resistance reaches a predetermined maximum, means operable at the end of said distance to reverse said feed and readvance said spindle, and means responsive to said spindle reaching a predetermined point for automatically reversing said feed to fully retract said spindle after said drill has completed its operation.

11. A drilling machine, comprising a frame, a spindle arranged in said frame, a drill carried by said spindle, a drive for rotating said spindle, a feed for advancing said spindle independently of said drive to pass said drill into the article to be drilled, means responsive to the resistance to the movement of said drill for reversing said feed to retract said spindle a predetermined distance each time said resistance reaches a predetermined maximum, means operable at the end of said distance to reverse said feed and readvance said spindle, and means responsive to said spindle reaching a predetermined point for reversing said feed to automatically retract said spindle to its starting position after said drill has completed its operation.

12. A drilling machine, comprising a frame, a spindle arranged in said frame, a drill carried by said spindle, a drive for rotating said spindle, a feed for advancing said spindle independently of said drive to pass said drill into the article to be drilled, means responsive to the resistance to the movement of said drill for reversing said feed to retract of said drill for reversing said feed to retract said spindle to a predetermined point each time said resistance reaches a predetermined maximum, means operable upon said spindle being retracted to said point to reverse said feed to readvance said spindle, and means responsive to said spindle reaching another predetermined point to reverse said feed to automatically retract said spindle to its starting position after said drill has completed its operation.

13. A drilling machine, comprising a frame, a spindle arranged in said frame, a continuous drive for rotating said spindle, a feed for advancing said spindle independently of said drive, means responsive to the resistance to the movement of said spindle for reversing said feed to cause said spindle to be retracted, means for automatically reversing said feed to cause the same to readvance said spindle at high speed, and means for causing said feed to advance said spindle at slow speed after it has reached a certain point in its advance.

14. A drilling machine, comprising a frame, a spindle arranged in said frame, a hydraulic drive for rotating said spindle, a hydraulic feed for advancing said spindle independently of said drive to pass said drill into the article to be drilled, means responsive to the torque of said spindle for reversing said feed to retract said spindle a short distance each time said torque reaches a predetermined maximum, means for controlling said feed to cause the same to readvance said spindle at high speed to substantially the point from which it was retracted, means for controlling said feed to cause the same to continue the advance of said spindle at a lower rate of speed, and means for automatically reversing said feed to fully retract said spindle after said drill has completed its operation.

15. A drilling machine, comprising a frame, a spindle arranged in said frame, a hydraulic drive for rotating said spindle, a hydraulic feed for advancing said spindle independently of said drive to pass said drill into the article to be drilled, means responsive to the resistance to the forward movement of said drill for reversing said feed to retract said spindle a short distance each time said resistance reaches a predetermined maximum, means for controlling said feed to cause the same to readvance said spindle at high speed to substantially the point from which it was retracted, means for controlling said feed to cause the same to continue the advance of said spindle at a lower rate of speed, and means for automatically reversing said feed to fully retract said spindle after said drill has completed its operation.

16. A machine, comprising an axially movable head, a relatively stationary head, a tool carried by one of said heads for operating upon work carried by the other head, power means for reciprocating said movable head toward and from said stationary head to move the tool into and out of engagement with the work, a drive for rotating one of said heads to enable the tool to operate upon the work, means operable at any point in the path of said movable head and responsive to tool resistance for reversing said power means to retract said movable head to disengage the tool and the work, means for again reversing said power means to readvance said movable head at a uniformly high speed, and means operable at substantially the point from which the tool was retracted for operating said power means to reduce the speed of said movable head to feeding speed.

17. The combination, with a machine having an axially movable head, a relatively stationary head, a tool carried by one of said heads for operating upon work carried by the other head, a feed for reciprocating said movable head from a fully retracted position toward and from the stationary head, and a drive for rotating one of said heads to enable the tool to operate upon the work, of means for operating said feed to advance said movable head toward said stationary head to move the tool and the work into engagement with each other, means operable at any point in the path of said movable head and responsive to tool resistance for operating said feed to retract said movable head at high speed and disengage the tool and the work, means for operating said feed to stop said movable head at a point short of its fully retracted position and to readvance it at high speed, and means for operating said feed to arrest the rapid advance of said movable head at substantially the point from which it was retracted and to continue its advance at slow speed.

18. The combination, with a machine having an axially movable head, a relatively stationary head, a tool carried by one of said heads for operating upon work carried by the other head, a fluid operated feed for reciprocating said movable head from an initial stationary position toward and from the stationary head, and a fluid operated drive for rotating one of said heads to enable the tool to operate upon the work, of means for operating said feed to advance said movable head toward said stationary head to move the tool and the work into engagement with each other, means responsive to a predetermined increase in fluid pressure for operating said feed to retract said movable head at high speed and disengage the tool and the work, means for operating said feed to stop said movable head at a point short of its initial position and to readvance it at high speed, and means for operating said feed to arrest the rapid advance of said movable head at substantially the point from which it was retracted and to continue its advance at slow speed.

19. The combination, with a machine having an axially movable head, a relatively stationary head, a tool carried by one of said heads for operating upon work carried by the other head, a feed for reciprocating said movable head from an initial stationary position toward and from the stationary head, and a drive for rotating one of said heads to enable the tool to operate upon the work, of means for operating said feed to advance said movable head toward said stationary head to move the tool and the work into engagement with each other, means responsive to tool resistance for operating said feed to retract said movable head at high speed and disengage the tool and the work, means for operating said feed to stop said movable head at a point short of its initial position and to readvance it at high speed, means for operating said feed to arrest the rapid advance of said movable head at substantially the point from which it was retracted and to continue its advance at slow speed, means for providing a limit to the advance of said movable head, means responsive to said movable head reaching said limit for operating said feed to retract said movable head at high speed to its initial position, and means responsive to said movable head returning to its initial position for stopping said machine.

20. The combination, with a machine having an axially movable head, a relatively stationary head, a tool carried by one of said heads for operating upon work carried by the other head, a fluid operated feed for reciprocating said movable head from an initial stationary position toward and from the stationary head, and a fluid operated drive for rotating one of said heads to enable the tool to operate upon the work, of means for operating said feed to advance said movable head toward said stationary head to move the tool and the work into engagement with each other, means responsive to a predetermined increase in fluid pressure for operating said feed to retract said movable head at high speed and disengage the tool and the work, means for operating said feed to stop said movable head at a point short of its initial position and to readvance it at high speed, means for operating said feed to arrest the rapid advance of said movable head at substantially the point from which it was retracted and to continue its advance at slow speed, positive stops for engaging each other to provide a limit to the advance of said movable head, means responsive to fluid pressure created upon said stops engaging each other for operating said feed to retract said movable head at high speed to its initial position, and means responsive to said movable head returning to its initial position for stopping said machine.

DONALD CLUTE.
LESTER STERLING.